(12) United States Patent
Beall et al.

(10) Patent No.: US 10,116,884 B2
(45) Date of Patent: Oct. 30, 2018

(54) SYSTEMS AND APPROACHES FOR THERMAL IMAGING

(71) Applicant: HEMA IMAGING LLC, Minneapolis, MN (US)

(72) Inventors: Erik Beall, Eden Prairie, MN (US); Marius Popescu, Cluj-Napoca (RO)

(73) Assignee: HEMA IMAGING LLC, Eden Prairie, MN (US)

( * ) Notice: Subject to any disclaimer, the term of this patent is extended or adjusted under 35 U.S.C. 154(b) by 0 days.

(21) Appl. No.: 15/091,068

(22) Filed: Apr. 5, 2016

(65) Prior Publication Data

US 2016/0295134 A1    Oct. 6, 2016

Related U.S. Application Data

(60) Provisional application No. 62/143,160, filed on Apr. 5, 2015.

(51) Int. Cl.
| | |
|---|---|
| *H04N 5/33* | (2006.01) |
| *G06K 7/10* | (2006.01) |
| *G06K 9/00* | (2006.01) |
| *G06T 5/00* | (2006.01) |
| *G06T 7/20* | (2017.01) |
| *G06T 7/60* | (2017.01) |

(Continued)

(52) U.S. Cl.
CPC ......... *H04N 5/332* (2013.01); *G06K 7/10297* (2013.01); *G06K 9/00771* (2013.01);
(Continued)

(58) Field of Classification Search
CPC ................. H04N 5/332; G06T 7/0024; G06T 2207/30244; G06T 2207/10048;
(Continued)

(56) References Cited

U.S. PATENT DOCUMENTS

| | | |
|---|---|---|
| 6,845,913 B2 | 1/2005 | Madding et al. |
| 7,454,050 B2 | 11/2008 | Garvey |

(Continued)

FOREIGN PATENT DOCUMENTS

WO    WO-2014127431 A1    8/2014

OTHER PUBLICATIONS

Rangel et al., "3D Thermal Imaging: Fusion of Thermography and Depth Cameras", 12th International Conference on Quantitative Infrared Thermography (2014).

(Continued)

*Primary Examiner* — Joseph Ustaris
*Assistant Examiner* — Jill Sechser
(74) *Attorney, Agent, or Firm* — Marshall, Gerstein & Borun LLP

(57) ABSTRACT

A thermal imaging system includes a thermal imaging sensor adapted to capture any number of thermal images of any number of assets in an environment, a non-thermal imaging sensor coupled to the thermal sensor and being adapted to capture any number of non-thermal images of the assets, an asset identification system adapted to identify a particular asset from the assets, an image alignment system, and a controller adapted to control operation of the thermal imaging sensor, the non-thermal imaging sensor, the asset identification system, and the image alignment system. Upon identifying the particular asset via the asset identification system, the controller is adapted to control the image alignment system to adjust an orientation of the thermal image and the non-thermal image and cause the thermal imaging sensor and the non-thermal imaging sensor to capture the image.

26 Claims, 9 Drawing Sheets

(51) Int. Cl.
*G06T 7/00* (2017.01)
*G06T 3/60* (2006.01)
*G06T 7/80* (2017.01)
*G06T 7/33* (2017.01)
*G06T 7/254* (2017.01)
*G06K 9/20* (2006.01)

(52) U.S. Cl.
CPC .............. *G06K 9/2018* (2013.01); *G06T 3/60* (2013.01); *G06T 5/00* (2013.01); *G06T 7/0004* (2013.01); *G06T 7/20* (2013.01); *G06T 7/254* (2017.01); *G06T 7/33* (2017.01); *G06T 7/60* (2013.01); *G06T 7/80* (2017.01); *H04N 5/33* (2013.01); *G06T 2200/24* (2013.01); *G06T 2207/10048* (2013.01); *G06T 2207/30204* (2013.01); *G06T 2207/30208* (2013.01); *G06T 2207/30244* (2013.01)

(58) Field of Classification Search
CPC  G06T 2207/20224; G06T 2207/30204; G06K 7/10297; G06K 9/00771
See application file for complete search history.

(56) References Cited

U.S. PATENT DOCUMENTS

| | | | |
|---|---|---|---|
| 7,995,830 B2 | 8/2011 | Garvey | |
| 8,300,922 B1 | 10/2012 | Garvey, III | |
| 8,410,441 B2 | 4/2013 | Stratmann et al. | |
| 8,797,409 B1 | 8/2014 | Heinke | |
| 9,100,595 B2 | 8/2015 | Schmieder et al. | |
| 9,241,151 B2 | 1/2016 | Joo | |
| 2004/0164858 A1* | 8/2004 | Lin | G08B 13/19608 340/522 |
| 2004/0201756 A1 | 10/2004 | VanBree | |
| 2006/0139475 A1 | 6/2006 | Esch et al. | |
| 2006/0177150 A1 | 8/2006 | Uyttendaele et al. | |
| 2010/0205553 A1 | 8/2010 | Haigh et al. | |
| 2012/0281098 A1 | 11/2012 | Wagner | |
| 2013/0050453 A1 | 2/2013 | Bergstrom et al. | |
| 2013/0155248 A1* | 6/2013 | Neeley | H04N 5/33 348/159 |
| 2013/0155249 A1 | 6/2013 | Neeley et al. | |
| 2014/0160298 A1 | 6/2014 | Johnson | |
| 2014/0198955 A1 | 7/2014 | Deigmoeller et al. | |
| 2015/0109442 A1* | 4/2015 | Derenne | G08B 21/245 348/143 |
| 2015/0185592 A1* | 7/2015 | Eineren | G03B 17/02 348/375 |

OTHER PUBLICATIONS

Henry et al., "RGB-D Mapping: Using Depth Cameras for Dense 3D Modeling of Indoor Environments", 12th International Symposium on Experimental Robotics, 18-21 (2010).

Non-final Office Action, U.S. Appl. No. 15/091,383, dated Dec. 29, 2016.

* cited by examiner

SYSTEMS AND APPROACHES FOR THERMAL IMAGING

CROSS-REFERENCE TO RELATED APPLICATION

This application claims the benefit of U.S. Provisional Application No. 62/143,160, filed on Apr. 5, 2015, the contents of which are herein incorporated by reference in its entirety.

FIELD OF THE DISCLOSURE

The present disclosure generally relates to thermal imaging and, more particularly, to systems and approaches for acquiring repeatable thermal images and automatically identifying assets.

BACKGROUND

Thermal imaging is a sensing method for non-contact measurement of temperatures of thermally emissive objects. Thermal imaging devices detect radiation emitted by objects by sensing infrared photons and identifying the flux thereof. By using multiple sensing and focusing elements, the thermal photon flux from separate solid-angular fields of view can be obtained in a similar manner as visible-light cameras. As a result, an image of the temperature of objects being captured is generated.

Thermal imaging may be used to observe operating characteristics of electronic and/or mechanical equipment used in any number of industrial environments such as, for example, manufacturing, fabrication, and/or processing facilities. For example, localization of objects with heat contrast can assist in understanding or discerning the location of a conduit in a wall, a source of a water leak, or identifying faulty and/or overloaded circuit breakers. In these examples, a useful image interpretation may be straightforward such that an untrained or inexperienced user may perform it and discern the issue. In some examples, it is advantageous to enhance the interpretability of the images and perform a thorough analysis of the image and the underlying data in order to obtain a binary decision regarding the functional or structural integrity of an object or the determination of a quantitative figure relating to the functional or structural integrity thereof. As an example, in the field of window retrofitting for the purpose of increasing energy efficiency, an estimate of the insulation quality of a window is useful in order to determine the return on investment of a replacement window with a potentially higher insulation quality. In other examples, the determination of excessive current carried through a circuit breaker can identify a failed closed circuit breaker by determining the breaker rating through optical character recognition in a visible-light image, integrating the heat associated with the breaker, and using any number of approaches to calculate the estimated current carried through the breaker to obtain a binary measure of the breaker's integrity and/or a probabilistic estimate of the confidence of the measure. In both of these examples, the determinations are manually calculated and can be error-prone and time consuming.

Thermal imaging may also be incorporated into a predictive maintenance process used to determine the optimum time when equipment should be serviced and/or replaced. Excess heat given off by equipment is often a key indicator of excess wear or impending equipment failure, thus thermal imaging can serve an integral role in maintaining an efficient and productive work environment.

To perform a thermography scan, i.e., to obtain thermal images of thermally emissive objects, thermographers first identify all relevant unique objects and/or equipment, commonly referred to as "assets," which may demonstrate an abnormal temperature-related issue. Thermal images are taken of each asset using a thermal camera while the thermographer adjusts for contrast and brightness, otherwise known as "level" and "span," to set a mid-image temperature and temperature ranges in the image to optimize information presented therein. Setting appropriate level and span values is of particular importance because these values must appropriately surround meaningful temperature ranges in order to see and record abnormalities in thermal images. As an example, if the desired asset is an electrical panel, there may be a high temperature connection that exists under normal operating conditions. To ignore the high temperature connection, the top of the temperature range must be adjusted and saturated to allow for other subtle temperature variances to be seen. As another example, if an abnormally hot connection is identified, the thermographer may still wish to identify milder abnormally hot conditions. Accordingly, the level and span must be adjusted until any subtler issues become apparent. The thermographer can then record the image to be reviewed and analyzed. Thermographers will typically follow a designated route through the environment to sequentially capture images to allow for repeatability on later dates. During or after the process of obtaining images of all desired assets, the thermographer will review the images and ultimately identify areas of interest and/or concern.

Typically, this process must be repeated, e.g., every 6 months, to monitor areas of interest and/or identify any new areas of interest or concern. However, due to the specialized nature of industrial thermography, thermographers are again needed. Thermographers will thus periodically return to the environment, as needed, to re-perform their analysis. In doing so, they will follow a specified image capture route, created based on the initial thermography scan, that allows them to retrace their steps.

Nonetheless, it will be appreciated that using thermographers to obtain subsequent images to be analyzed can be prohibitively costly and time consuming. As an example, the environment (e.g., the manufacturing facility) may have to be shut down to perform the thermography scan and/or one or more employees may have to work with the thermographer to perform the scan.

Moreover, the acquisition of thermal images of the same scene at multiple times is typically associated with differences in the camera location and orientation (or camera "pose"). These differences in acquisition can result in images that do not match on a pixel-by-pixel basis, meaning one pixel does not refer to the same part of the scene or object within the scene in all images. It is possible to ensure a match across time points by fixing the camera in place, for example using a camera mount, or a tripod mount, that is located at a fixed location over time, such that the camera acquisition occurs at exactly the same location and orientation with respect to the scene at each time point. However, doing so is difficult because the orientation must be aligned exactly which is a time-consuming and error-prone process, and if the camera is left mounted at that location permanently, the camera is then unavailable to inspect other equipment and furthermore is susceptible to subtle shifts in pose over time.

Further, each scene to be monitored with repeated image acquisitions may be of a unique asset or part of asset, and therefore it may not be possible to differentiate between unique asset scans on the basis of the images themselves, which may lead to potential errors in misidentification of an image as referring to the wrong asset or part of asset. The proper analysis of thermal images when multiple scenes are present requires the correct association of a diagnostic thermal image with a scene. Each scene of an asset is typically unique, and when acquiring multiple scenes, it can be difficult to correctly identify the asset under investigation from a visual image alone, especially in the presence of multiple assets of the same type and appearance. Therefore, errors in scene identification can lead to failed diagnoses. To prevent this type of error, it is desired to uniquely identify each scene. In some cases it is possible to uniquely identify each scene using natural information from the image, such as the appearance of the asset and the background, and various methods for image matching may be useful, e.g. object recognition and template matching. However, in many cases natural scene information cannot be relied on because of an insufficient level of unique information, and in other cases, some of the natural scene information may change, e.g. due to dirt buildup, rust, movement of asset, and lighting changes.

BRIEF DESCRIPTION OF THE DRAWINGS

The above needs are at least partially met through provision of the systems and approaches for thermal imaging described in the following detailed description, particularly when studied in conjunction with the drawings, wherein.

Figure 1:
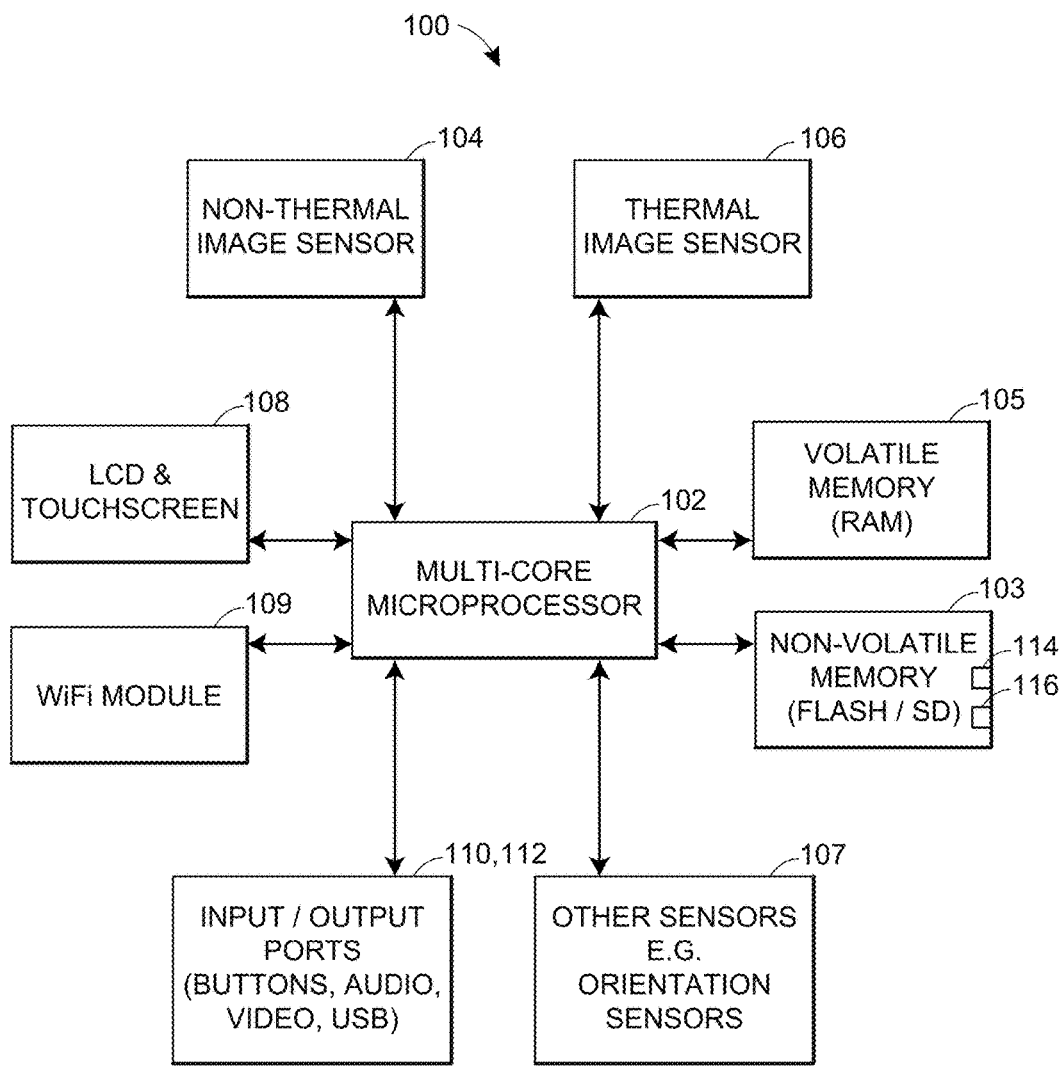
FIG. 1 illustrates a schematic illustration of a thermal imaging device in accordance with various embodiments of the invention.
Figure 2A:
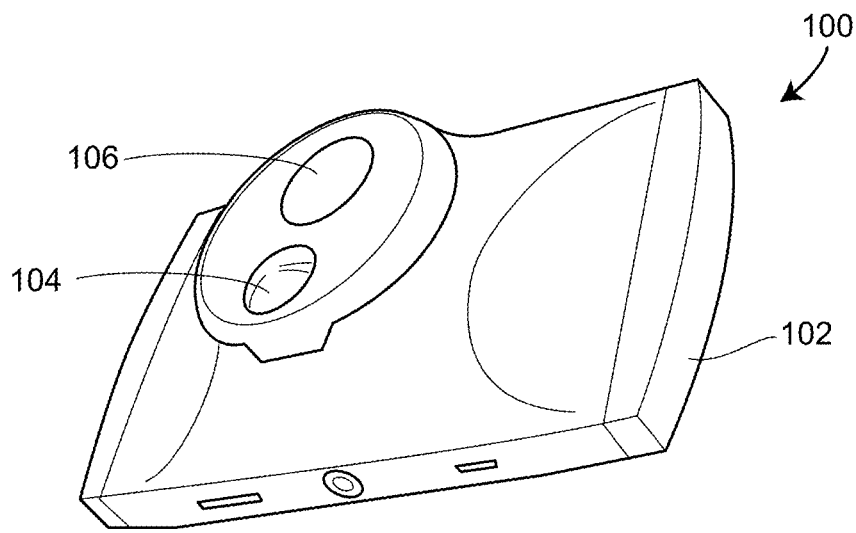
FIGS. 2A and 2B illustrate perspective views of an exemplary thermal imaging device of FIG. 1 in accordance with various embodiments of the invention.
Figure 2B:
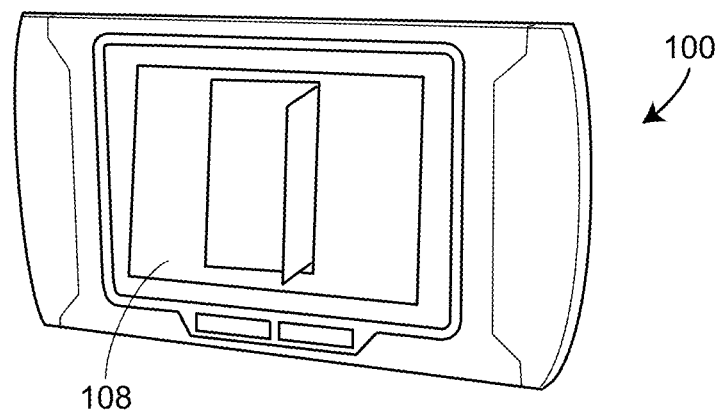

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Pursuant to these various embodiments, systems and approaches for thermal imaging provide for thermal image acquisition in a repeatable manner. These approaches provide for a process where image acquisition can be made synchronous across pixels within the relevant object-containing portions of the image scene. A transformed image is created, where each transformed pixel refers to the same part of the scene in all transformed images, by using computational rephotography and images from a non-thermal or visible-light camera that is aligned with a thermal camera. For example, an image is taken of a scene containing an asset which may be used as a base image or template for future measurements of that object. The image may be non-thermal, thermal, or a combination thereof. Alternatively, a representative or average image acquisition may be selected as the base image. In an exemplary embodiment, the non-thermal image acquisition is taken using a sensor having a global shutter or similar system which reduces and/or eliminates a rolling shutter artifact.

In some embodiments, a non-expert operator (i.e., an individual that may not possess the requisite skill of a professional thermographer) can utilize a device that provides information pertaining to the previous scan completed by the thermographer. For example, the operator can access the route previously traversed by the thermographer and thus can mimic the path travelled through the environment in order to capture images of assets in the same order as the thermographer previously did. Alternatively, the operator can traverse the path in an arbitrary order or traverse a portion of the path that only covers an incomplete set of assets within the path. The device may also identify the particular asset being captured to minimize confusion and eliminate instances of asset misidentification.

In some embodiments, images captured from prior scans (e.g., scans taken by a professional thermographer, thus having proper asset alignment, composition, and/or pose) are displayed on the thermography device to an operator performing a subsequent scan of the environment. Accordingly, the operator may properly align the device to capture images of the asset identically or nearly identically to the images captured by the professional thermographer, which allows the asset to be properly analyzed to determine if any thermal changes have occurred over time. In the event that the presently captured images are not fully aligned with previously captured images, systems and approaches described herein allow for post-capture image processing which can alter the present images to more closely match the alignment of the previously captured images. As a result, the non-expert operator need not be as concerned with properly aligning the scene prior to capturing the images, and thus difficulty and setup time may be greatly reduced.

As illustrated in FIG. 1, in many embodiments, a thermal imaging device 100 includes a controller or processor 102, non-volatile memory 103 having an asset identification system 114 and an image alignment system 116 stored thereon, a non-thermal image sensor 104, a volatile memory module 105, a thermal image sensor 106, any number of additional sensors 107, a display 108, a communication module 109, any number of inputs 110, and any number of outputs 112. In some forms, the thermal imaging device 100 is contained in a single housing. In other examples, components of the device 100 are contained in multiple housings. For example, some components such as the thermal image sensor 106 and the controller 102 may be contained in a first housing, and the non-thermal image sensor 104, display 108, and inputs 110 and outputs 112 may be contained in a second housing. In these examples, a separate handheld computing device such as a cellular telephone, tablet, or any other device may be utilized. Components such as the non-thermal image sensor 104, the controller 102, the display 108, and/or the inputs 110 and outputs 112 may be a part of the handheld device, and the thermal image sensor 106 and any other additional components may be adapted to be coupled to and communicate with the handheld device using any number of approaches known in the art. It is further understood that the device 100 may include any number of additional components.

The controller 102 may be any computing device capable of reading and executing any number of computer-readable instructions and execute arbitrary processing operations. The controller 102 may be a processor or processors, and may be in communication with any number of components such as the volatile and non-volatile computer-readable storage modules 103, 105 (e.g., random access memory and flash drives, hard drives, etc.), the wired and/or wireless communication modules 109, inputs and/or outputs 110, 112, and the like. These additional components may be located on a common circuit board or may be located on an electrically- or optically-connected circuit board. The controller 102 is adapted to control operation of the thermal imaging sensor 106, the non-thermal imaging sensor 104, the display 108, the asset identification system 114, the image alignment system 116, and any other additional components, as will be described in greater detail below.

The computer-readable instructions may be contained in the non-volatile storage medium 103 or a separate connected non-volatile storage medium and direct the processing circuitry to execute code providing various functionality referred to as the operating system. Operating systems are components of computing devices well-known to those skilled in the art and thus will not be discussed in further detail for the sake of brevity. The operating instructions may be complemented by a standard-based application programming interface (API) that provides an extensible model that may be expanded and reconfigured to perform an arbitrary sequence of application instructions even when the sequence of processing is not presently known. The API provides abstractions of various processing capabilities and functions. The functionality provided by software APIs is well-known to those skilled in the art, and thus will not be discussed in further detail.

The asset identification system 114 and the image alignment system 116 may be stored on the non-volatile memory module 103. In other embodiments, the asset identification system 114 and the image alignment system 116 may be located remotely from the device 100 (e.g., on a server), and may communicate with the controller 102 via any known communication method using the communication module 109. The asset identification system 114 is adapted to identify a particular asset from the plurality of assets in the environment. The image alignment system 116 is adapted to align images captured in previous scans with either images currently being captured (or about to be captured) or images captured in scans merely subsequent to the scan performed by the operator of the thermal imaging system to generate images taken from a uniform perspective to ensure the same portions of the asset are captured in each image.

The non-thermal image sensor 104 may be any type of visible, near infrared or other non-thermal wavelength light sensor. In one embodiment, the non-thermal image sensor 104 may be a visible light camera which is sensitive to the visible light spectrum. The non-thermal image sensor 104 is adapted to capture non-thermal light images and/or video of any number of assets in the environment. The thermal image sensor 106 may be any type of imaging sensor adapted to capture thermal images and/or video of any number of assets in the environment. The thermal image sensor 106 may be any type of imaging sensor array which is sensitive to thermal light such as, for example, a microbolometer array, a thermopile array, a thermal diode array, or any other array of sensors which are sensitive to photons and calibrated to produce a non-contact electronic measurement proportional to a temperature of an emissive object in the thermal image array field of view. The non-thermal image sensor 104 and/or the thermal image sensor 106 may transmit the images and/or video to the controller 102 via a wired or wireless connection.

Non-thermal images and thermal images taken by the non-thermal image sensor 104 and/or the thermal image sensor 106 may be combined in a number of ways in order to enhance the information or interpretability of the individual images. Any of the visible-light images, thermal images, or the combined images can be recorded for later examination, displayed on an output visible-light display system (e.g., the display 108) on the device 100, or transferred to a separate display device (e.g., a separate computing device having a screen).

The display 108 may be any type of output visible-light display system such as, for example, a liquid crystal display (LCD) or other display device such as a TFT display. The display 108 may be coupled with a touchscreen interface for combined display and touchscreen user input.

The inputs 110 and outputs 112 may be any type of component or components which allow the operator to interact with the device 100. In some examples, the inputs 110 may be any number of buttons, switches, toggles, actuators, and the like which are coupled to the device 100. In some forms, the inputs 110 may also be icons or buttons displayed on the display 108. The outputs 112 may be coupled to the display 108 to provide a visual representation of processing, analysis, or any other task executed by the controller 102. Other examples of uses for the inputs 110 and/or outputs 112 are possible.

Sensor Calibration

Figure 3:
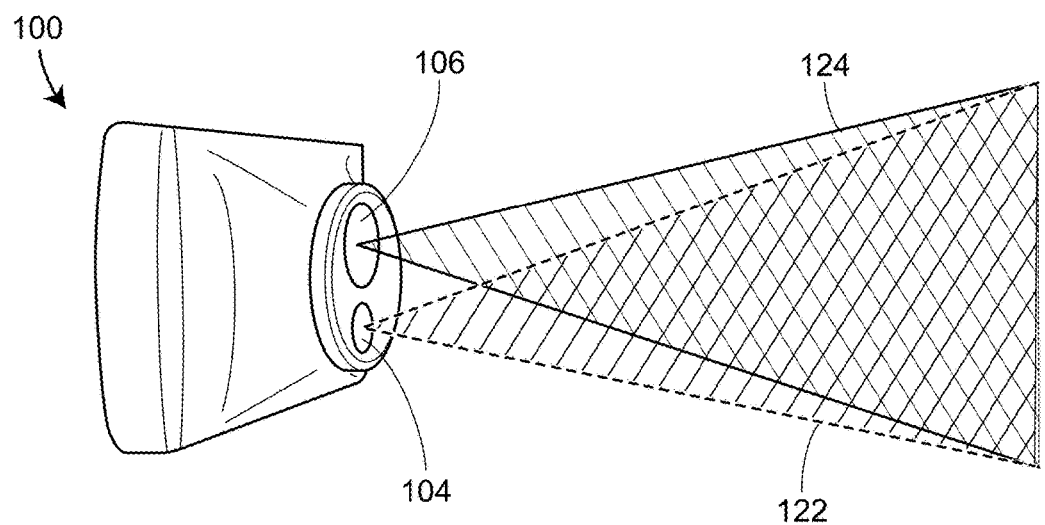
FIG. 3 illustrates a perspective view of the exemplary thermal imaging device of FIGS. 1, 2A and 2B, further illustrating fields of view of a thermal camera and a non-thermal camera in accordance with various embodiments of the invention.

As illustrated in FIG. 3, the non-thermal image sensor 104 generates a first field of view 122 (denoted by dashes or "–") and the thermal image sensor 106 generates a second field of view 124 (denoted by plusses or "+"). The non-thermal image sensor 104 and the thermal image sensor 106 are arranged such that the fields of view overlap at area 126. This overlapping field of view 126 represents a combined imaging field of view, and may utilize computer-readable instructions for performing a matched field of view transform and image combination operations when used with the non-thermal image sensor 104 and thermal image sensor 106. A parallax offset and field of view transformation difference between the combined images can be corrected by applying a distance-dependent transform matrix.

Figure 4:
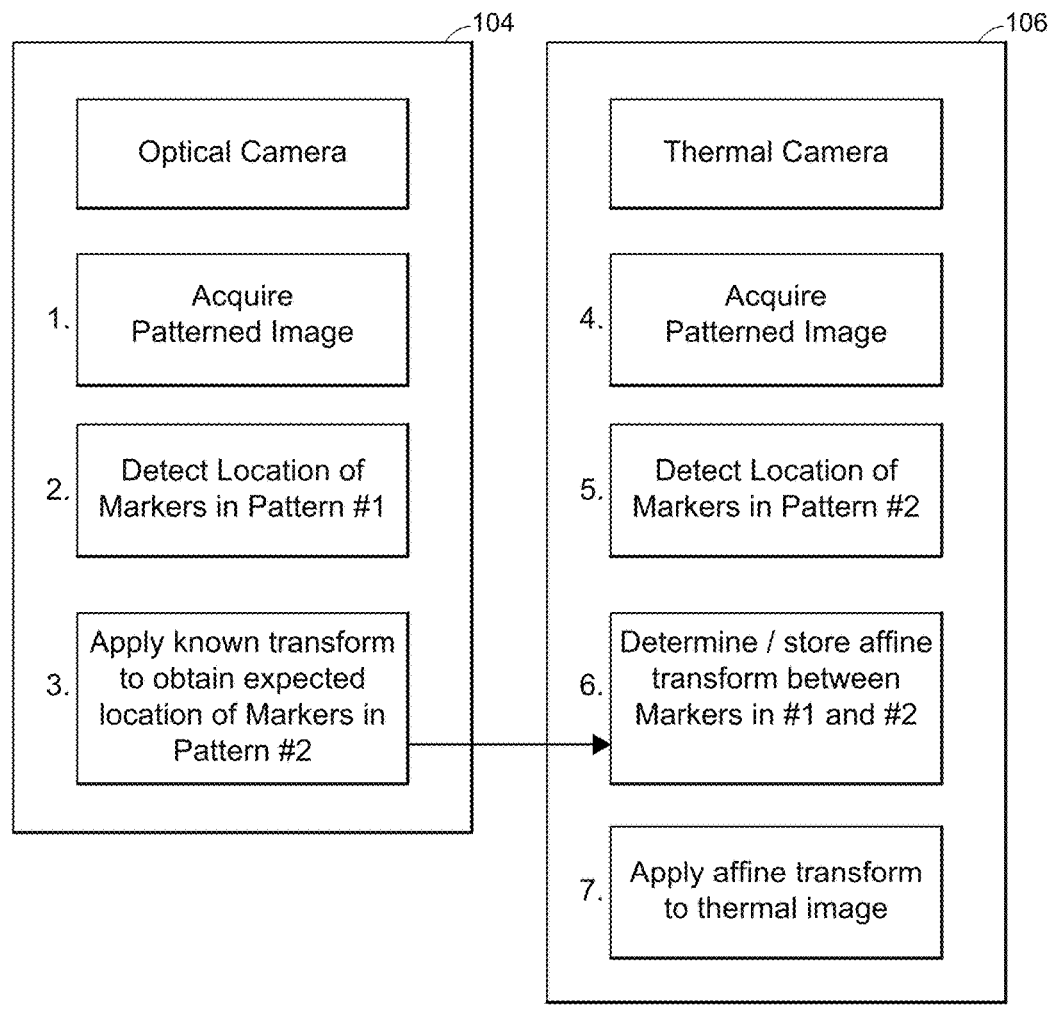
FIG. 4 illustrates an exemplary flowchart for calibrating the non-thermal image sensor and the thermal image sensor of FIGS. 1-3 in accordance with various embodiments of the invention.
Figure 5:
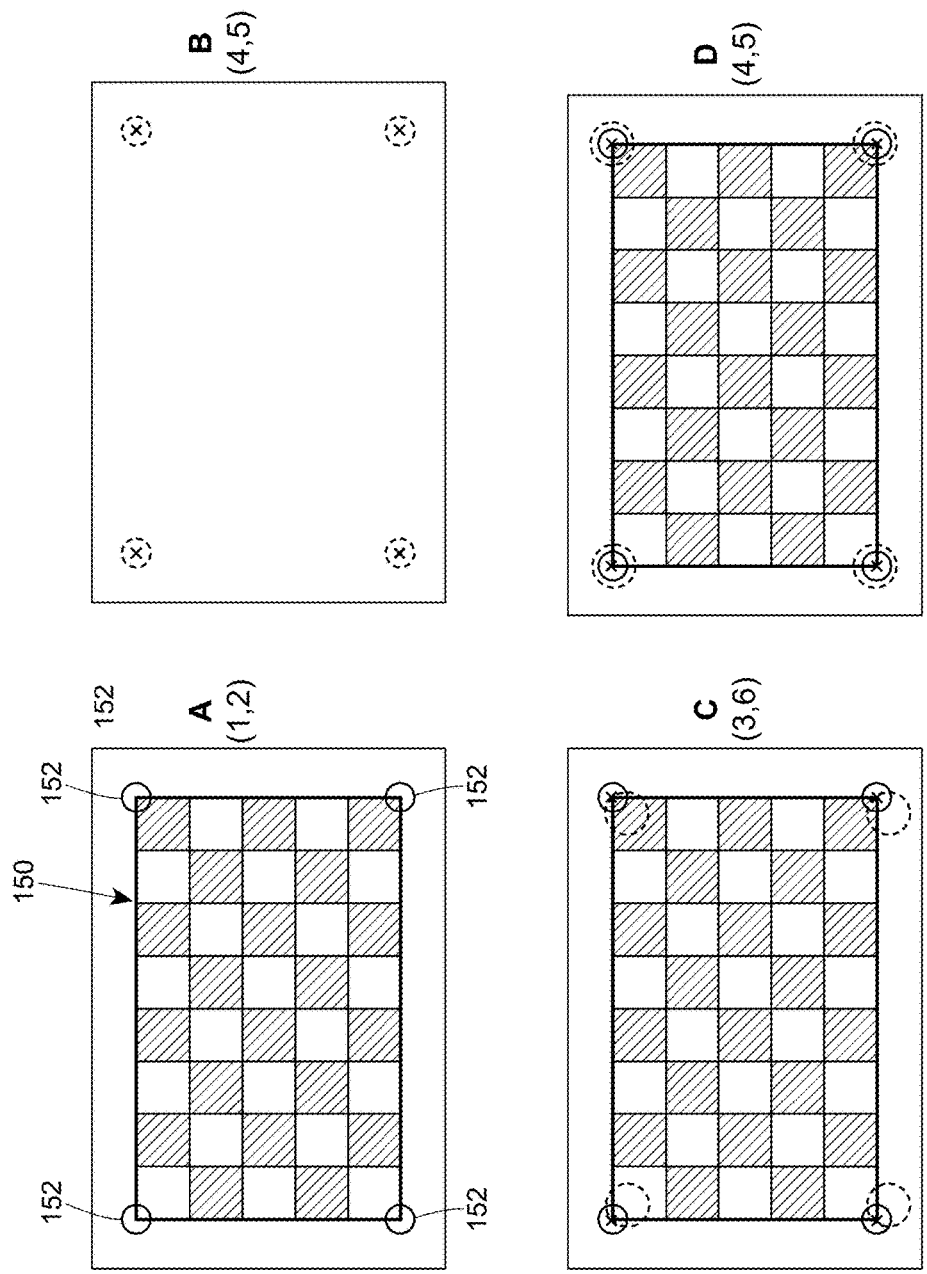
FIG. 5 illustrates an exemplary visualization of the flowchart for calibrating the non-thermal image sensor and the thermal image sensor of FIG. 4 in accordance with various embodiments of the invention.

Turning to FIGS. 4 and 5, in some examples, the controller 102 may be adapted to spatially calibrate the non-thermal image sensor 104 and the thermal image sensor 106 despite having different wavelength sensitivities. In FIG. 5, visualization "A" depicts an image obtained from the non-thermal sensor 104, visualization "B" depicts an image obtained from the thermal image sensor 106, and visualizations "C" and "D" depict a combination of the images obtained from the non-thermal image sensor 104 and the thermal image sensor 106. Other approaches for spatially calibrating the fields of view of the non-thermal image sensor 104 and the thermal image sensor 106 are well known to those skilled in the art.

In these examples, the environment can include structured elements consisting of a printed pattern (e.g., a checkerboard pattern 150) visible by the non-thermal image sensor 104. Any number of markers 152 are placed at the corners of the pattern 150. These markers 152 may either be heated or cooled such that their temperature varies from the ambient temperature sufficiently to be resolved from the background by the thermal imaging sensor 106.

With reference still to FIGS. 4 and 5, at step 1 and step 4, the non-thermal imaging sensor 104 and thermal imaging sensor 106 (having overlapping imaging fields of view) are directed at the scene such that the pattern 150 is within the image field of view of the non-thermal imaging sensor 104 (as illustrated in visualization A) and the thermally visible markers 152 are within the image field of view of the thermal imaging sensor 106 (as illustrated in visualization B). The visible structured elements (e.g., the elements viewable by the non-thermal image sensor 104) are resolved within the visible field of view using any number of approaches known in the art such as, for example, computer vision software. At step 2, the visible image is processed to resolve the visible image field of view pixel location of the inner corners of the pattern 150 on the visible image, and at step 5, the thermal pixel location of the four heated or cooled markers 152 is resolved within the thermal image field of view using image thresholding, segmentation, spatial filtering, and/or averaging. Other approaches to resolving the thermal pixel locations are possible.

At step 3, and visualization C, a known transform is applied to the image obtained from the thermal image sensor 106 to obtain an expected location of the thermal markers 152 on the visible image using the controller 102. In other words, the non-thermal image field of view is matched to the thermal image field of view. As shown in visualization C, the estimated location of the thermal markers illustrated in broken lines does not match their location calculated from the visible camera. At step 6, an affine two-dimensional spatial transformation that matches these locations is performed by the controller 102. At step 7 and visualization D, the affine transformation is applied to the thermal image and results in a spatially calibrated thermal image matching the visible image field of view. The matrix describing this affine calibration is then stored for subsequent uses of the device as long as the relative positioning or fixation between the non-thermal image sensor 104 and the thermal image sensor 106 is unchanged during use. Accordingly, the non-thermal image sensor 104 and the thermal image sensor 106 are properly calibrated to allow images from each sensor to be aligned with each other.

It is understood that this process may be repeated for different distances between the sensing body and the imaging plane in order to produce a set of distance-dependent calibration matrices. These distance-dependent calibration matrices can be used to correct images acquired at a range of different distances having differing alignment parallax offsets. In some examples, the operator is directed to select a fixed distance before acquiring images. This distance can be used to select a fixed image transform matrix to be used in all subsequent image acquisition image processing to align the thermal sensor image with the visual sensor image. In most cases, the image transform calibration constants are determined once for a particular spatial arrangement of the thermal image sensor and the non-thermal image sensor.

Image Alignment

In some examples, thermal and non-thermal images of an asset may be aligned in a uniform manner to allow for accurate analysis of changes to the thermal profile of the asset over a specified time period. In these examples, an image is taken of the asset or an environment containing the asset and is used as a template for future measurements of that asset. This image or images may be non-thermal, thermal, both thermal and non-thermal, or a combination thereof, and may be captured by a professional thermographer. When a subsequent measurement of the particular asset of interest is desired, the image alignment system 116, controlled by the controller 102, causes the template scene image to be shown on the display 108 linked to the imaging device 100.

The operator may then prepare to acquire images of the environment using approximately the same imaging orientation and distance from the asset as well as the same overall field of view of the environment, such that the environment matches the template environment as closely as possible. While acquiring the matching image, the original template environment image may be shown on the display 108 as a transparent and/or translucent overlay on the present image, the present image may be processed and displayed as a transparent and/or translucent overlay on the template image, or only the template image or the present image may be shown. In some examples, the template or present image may be further processed prior to display by first applying edge-detection image processing (e.g., Canny edge detection) to the template image and/or the present image, and then overlaying the one processed image onto the other processed template or present image.

Figure 6:
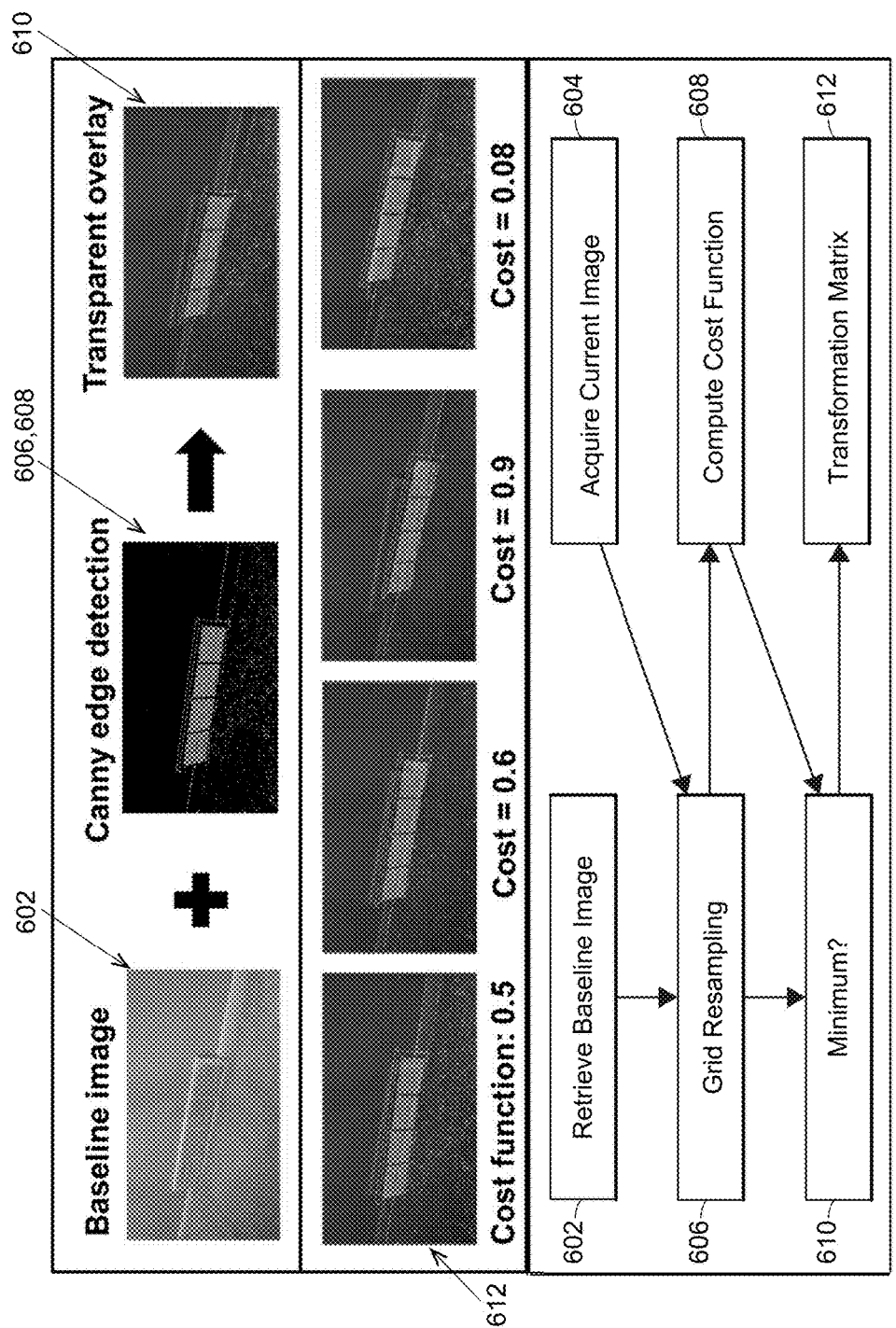
FIG. 6 illustrates an exemplary approach for aligning images taken at different times using an image alignment system in accordance with various embodiments of the invention.

Numerous computational approaches are known for aligning images. Some of these approaches are classified as intensity-based alignment or feature-based alignment. In these approaches, the alignment transformation between the images may be classified as either a linear or a nonlinear transformation. As a non-limiting example using intensity-based image registration to determine a linear transform that aligns images, and as illustrated in FIG. 6, an approach 600 for aligning images taken at different times using an image alignment system is described. There are numerous variations in methods for performing intensity-based alignment of images known to those skilled in the art including various optimization methods for adjusting the transformation such as, for example, markov random fields, New Unconstrained Optimization Algorithm (NEWUOA), or gradient descent, various cost functions for computing difference between transformed images or image histograms such, as but not limited to, least squares, mutual information, correlation ratio, local pearson correlation or normalized correlation, various interpolation methods and various transform restrictions such as, for example, rigid, partial affine with scale plus rigid or full affine.

In this example, baseline and current images (of the current field of view) are acquired at 602, 604. The image alignment system 116 is then applied to the baseline image and/or the present image, and overlays the present image onto the template, baseline, or original image via grid resampling at step 606. At 608, a least squares cost function is computed of the sum of squares of the difference between the original template image and a processed version of the present image being acquired. Image processing applied prior to the computation of the cost function may include spatial transformation, histogram normalization, image segmentation, thresholding, spatial filtering, edge detection, or other such processing known by those in the art. The image difference cost function may be computed using a number of approaches such as, for example, least-squares difference, normalized mutual information, local Pearson correlation and the like. Other examples are possible.

The cost function may be displayed via the display 108 to assist the operator in determining how close or far the present image is from the previous image. In other examples, the cost function may be used after acquiring many images to allow for post-hoc selection of an image or images that most closely match the template scene, or the cost function may be used as a minimization function in an iterative search for a linear image transformation to spatially align the images such that the images match the template more closely.

In one non-limiting example, the template image and the present image are compared after processing by spatially transforming at least one of the images with a linear transformation matrix, by computing the sum of squares of the difference between the processed template and present images as the cost function. The cost function is then used to search for a linear image transform coregistration that minimizes 610 this cost function. By searching for a transform matrix 612 that minimizes the cost function, the transformation that results in the best spatial match between template and present images is determined. Many variations of search strategy are possible, such as, for example, hierarchical gradient descent. Further quality measures such as the residual least squares difference may be used to determine success of the registration procedure. It is understood that the image alignment system 116 may apply image processing to a previously- and/or presently-captured non-thermal and/or thermal image of the particular asset using the non-thermal image sensor 104 and/or the thermal image sensor 106.

Figure 7:
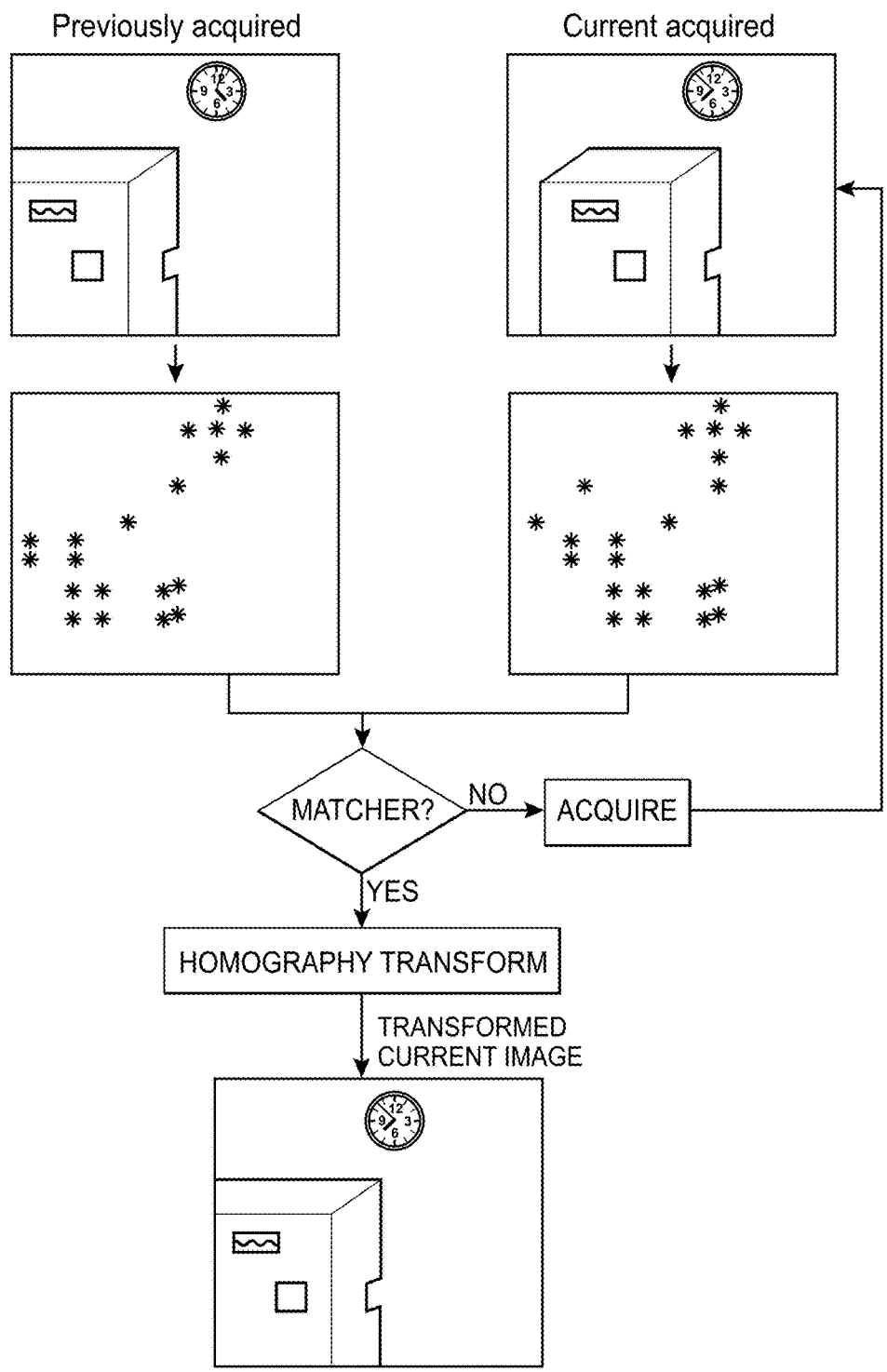
FIG. 7 illustrates an exemplary approach for aligning images taken at different times using a feature-based image alignment system in accordance with various embodiments of the invention.

As a non-limiting example and as illustrated in FIG. 7, image features are used to align the images. In this example, the image alignment system 116 computes and stores any number of image feature vectors describing the environment to be recalled during subsequent scans. The feature descriptors can be computed using any known feature-based description method, such as, for example, descriptors that are less sensitive to camera pose and image intensity. Examples include, but are not limited to, features based on a histogram of oriented gradients, oriented binary robust independent elementary features, binary robust invariant scalable keypoints, fast retina keypoints and others.

The image alignment system 116 may determine feature vectors in the current image and compare these vectors with the stored vectors using approaches known to those skilled in the art such as, for example, random sampling, consensus, nearest neighbors, or brute force matching. In the event of a correspondence above a threshold value determined to indicate a match, the matched feature points from the current image and the stored feature points may be passed to a method for determining the perspective transformation between matched points and the perspective transformation applied to the current image. If the perspective transform can be approximated by an affine homography transform, then the perspective transform can be decomposed and used similar to a linear rigid or affine transformation matrix. The resulting perspective-transformed current image may pass through a secondary image co-registration procedure with the stored previously acquired image as the registration target and the resulting image transformations may be combined with the perspective transform and the resulting transform applied to the current non-thermal image data or paired thermal image data. The image alignment system 116 may then allow the previous thermal and/or non-thermal images to be compared with the present thermal and/or non-thermal images to visualize and identify changes between the current scene and the baseline scene using the display 108.

In some examples, the image alignment system 116 may invert the transformation and apply the inverted transform to the previously-acquired images instead of the current image. In some examples, the thermal level and span settings from the baseline or current thermal image are applied to the current or baseline thermal image while spatially matching the visual images, combining the visual to thermal sensor calibration transform with the visual scene transform from the image alignment system 116 and applying the derived transform or its inverse to one of the thermal images and processing both baseline and present images in order to display both at the same time blended or side-by-side. The baseline image may be the first image acquired of an asset, it may be updated periodically with contributions from later images, and/or it may be replaced by a later image, thus, it will be understood that the term "baseline image" can refer to a previously acquired image.

In some examples, the thermal image data obtained from one asset may be compared with thermal image data from a different, identical asset (e.g., two separate electrical panels). In these examples, the appearance of the two assets is sufficiently similar to allow a stable image homography transform or image co-registration, the transform to be applied to the second image, and images to be produced which appear to have been taken from the same perspective relative to the similar asset. The operator may in turn directly compare thermal patterns of the two objects by switching between the two images or performing a subtraction or other pixel-wise image transform to enhance the identification of differences.

In other approaches, the image alignment system 116 includes an inertial monitoring unit (IMU) coupled thereto. The IMU allows the camera orientation with respect to ground to be recorded and can be used to annotate the base image's orientation. This annotation can be used to estimate the orientation component of the pose correction, which is beneficial for later acquisition and computation by constraining the estimated pose to reduce errors and increase speed in computing the full orientation plus translation pose correction.

The IMU orientation with respect to ground can also be used to guide subsequent repeated image scene acquisition by feeding back the difference between the current sensor orientation and the base sensor orientation. It is noted that is not necessary that there be an IMU present for the full pose correction to be performed. During acquisition of subsequent images, the user must maintain a suitable degree of similarity in camera pose to the base camera pose. This similarity may be enforced either using landmarks and knowledge of the scene to be acquired (e.g. an indicator on the floor denoting "stand here for asset A" or simply operator awareness of the scene and functioning of the present system), the base image display or base image transformed in some manner (as previously described), or a displayed estimated pose correction between the current image to the base image can be used to guide the user. A real-time pose correction can be displayed in simplified form (e.g. which direction to move the camera center) in order to guide the camera to match the current scene with the scene in the representative base image. A transform between the current scene image and the base image can be generated through image registration, which may involve a perspective transform for all but small pose differences, or may involve a linear transform particularly if the pose difference is small.

The results of a real-time image transform can be used to help guide the user by assisting in the positioning of the camera, such as by indicating whether distance must be increased or decreased, or by displaying an indication signal proportional in some manner to the cost function of the image transform. Furthermore, the guidance can be simplified and separated into independent degrees of freedom for ease in adjusting only one degree of freedom at a time, because adjusting multiple degrees of freedom at once can be too difficult to perform. The image transform returned by the registration routine can be decomposed into translation, rotation and scaling components. The scaling component relates to the difference in distance between the base and current acquisition, thus a scaling factor greater or less than 1 indicates a difference in distance and a scaling factor of 1 means there is no detectable difference in distance. Accordingly, scaling can be used to guide the user to the correct image acquisition distance.

Figure 8:
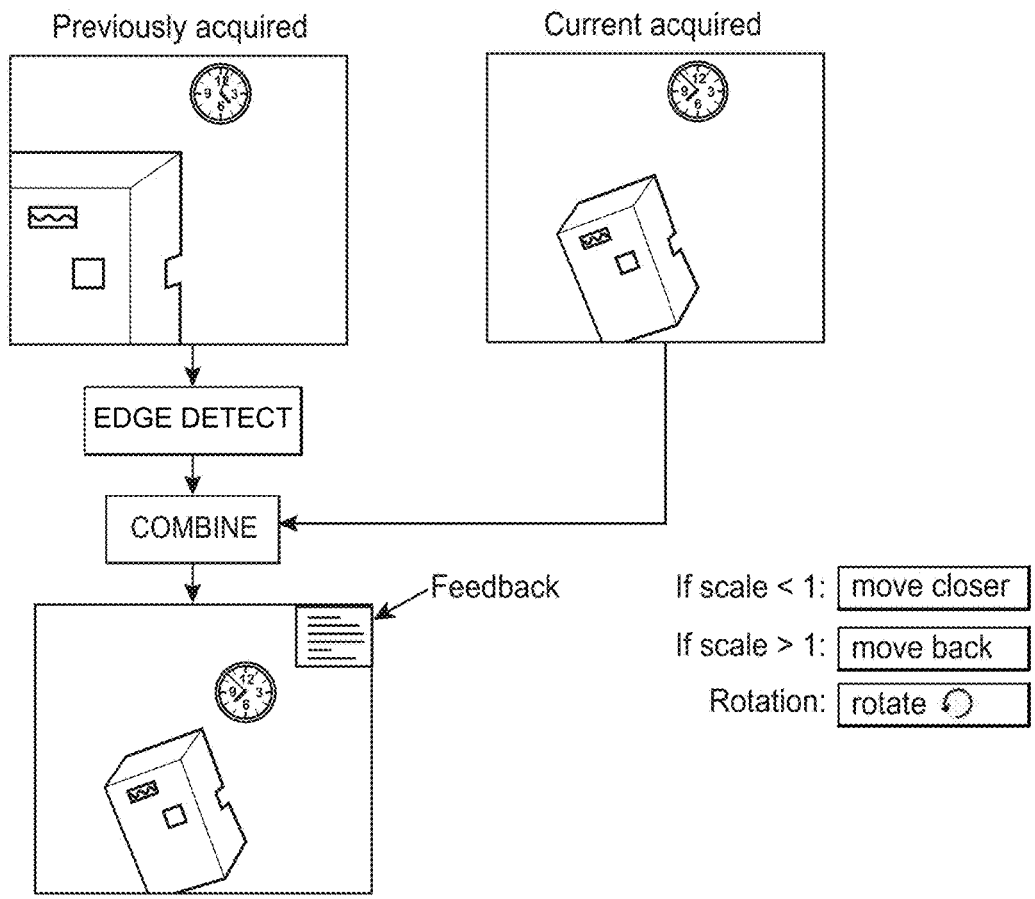
FIG. 8 illustrates an exemplary approach for aligning images taken at different times using a transform-derived feedback system in accordance with various embodiments of the invention.

As illustrated in FIG. 8, from the full pose correction or linear transform, the translation and rotation can be used to direct the operator to adjust the location and orientation of the camera in the plane perpendicular to the imaging axis such that it matches the location and orientation of the camera in the base camera pose. Alternatively, the orientation difference can be ignored if below a suitable threshold and any orientation differences can be handled post-acquisition by a feature-based, intensity-based, or other image alignment process performed by the image alignment system 116. Once the total transform difference from unity is below a pre-defined threshold or error bound, the thermal and visible image or set of suitably below-error images are saved. Following acquisition, a finer-grained (higher accuracy) post-hoc co-registration of the acquired visible image or images to the base visible image is computed, and applied to the visible and thermal images, to more closely match the images to the base image. By synchronizing images on a pixel-by pixel basis, pixel-wise statistical tests may be performed directly on the images.

Figure 9:
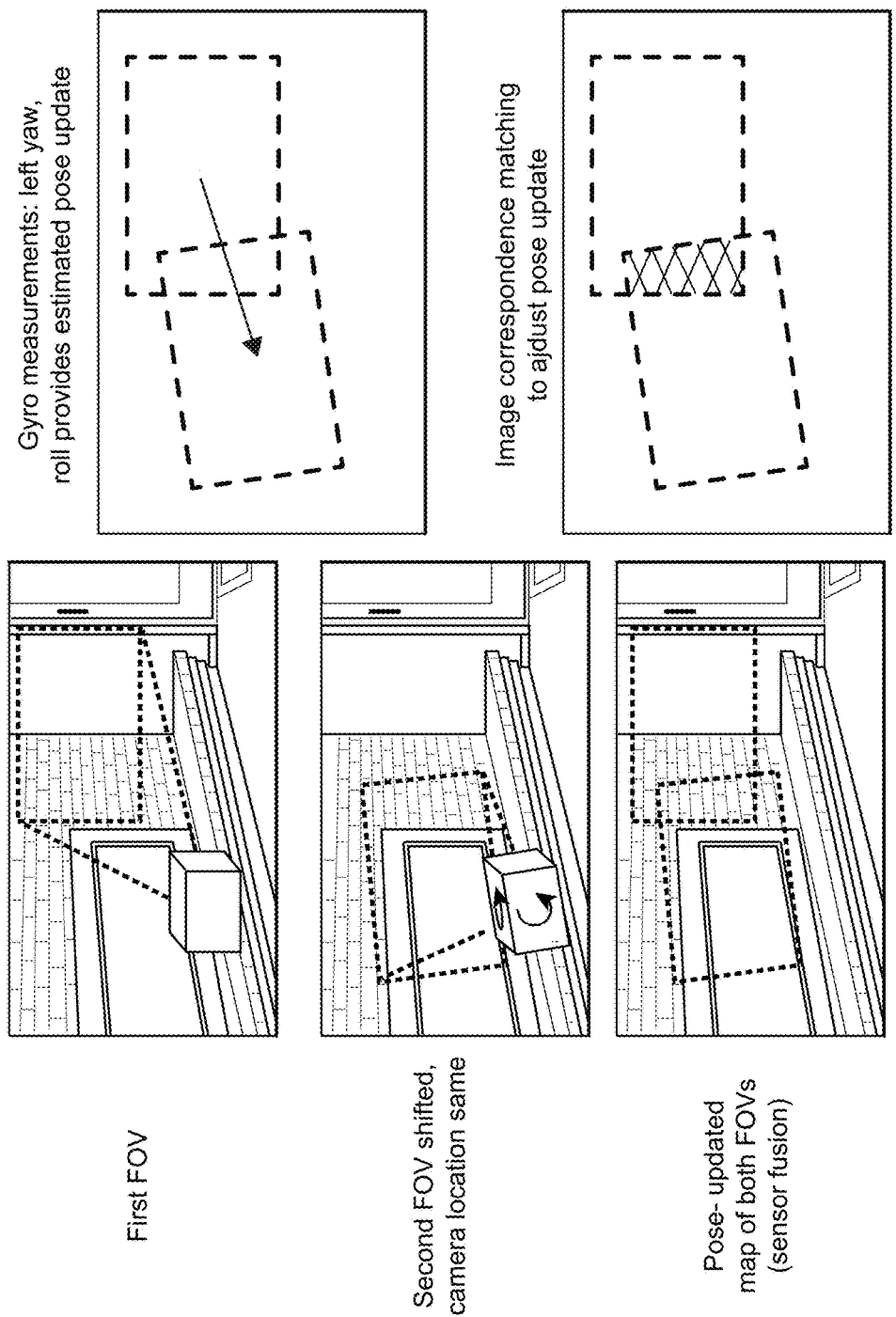
FIG. 9 illustrates an exemplary approach for aligning images using a feature-based image alignment system and an orientation sensor-assisted alignment system in accordance with various embodiments of the invention.

In some examples, and as illustrated in FIG. 9, the device 100 may utilize both feature-based alignment and orientation sensor-assisted alignment. In these examples, the image coregistration is decomposed into an image scale component, a rotation component, and a translation component. In the example illustrated in FIG. 9, simplified equations for the decomposition are shown. It is understood that other forms are possible. The components are used to display indicators on the display 108 which correspond to an intended repositioning and re-orienting of the device 100 so as to match a present pose (or orientation) of the device 100 with a previous pose of the device 100. The orientation system may include sensors such as an accelerometer, an inclinometer, a gyroscope, and/or an inertial monitoring unit, among other components. By measuring the pose of the system when capturing the previous or baseline image of the asset, this information may be used in subsequent scans to initialize an image coregistration search routine, thereby reducing error and time in the computation.

Asset Identification

In some embodiments, one or more unique identifiers are provided in each scene or near each scene to identify each particular scene. The unique identifier may, for example, take the form of a tag such as a barcode or a radio frequency identification tag, an object label or name tag, or other spatial pattern of information placed on or near each asset. During each image acquisition, the unique information is also captured within the scene, and in previous or subsequent image acquisitions, the relative timestamp and image information is used to link the pattern with the scene under investigation. In some examples, the identifying information is captured using a radio frequency identification reading system attached to or integrated into the imaging system.

For example, a unique identifier may be placed at the base of each of any number of assets in the form of welding robots, and during the course of scanning each robot, a scan is made of the identifier first, then the scan of the robot or the component parts of the robot is performed, and then the next robot is acquired in the same manner, with the identifier, which is acquired prior to the scan of the robot or robot parts, being used to uniquely link those images with that asset. In the event that multiple parts of a particular asset are scanned, template matching may be used to uniquely identify any images with the appropriate part of that asset. The timestamp of the next identifier indicates that any subsequent scan data refers to the next identifier until the following identifier is scanned. In some approaches, a spatial pattern can be placed within each scene, and each image capture is then uniquely identified using the pattern. If the tag is missing, corrupted or otherwise unavailable for use, then the user can indicate that the information is missing and the software can optionally attempt to use image matching or provide a list of potential or suggested asset labels to select from.

Prior to the baseline scan of an asset, the operator indicates to the imaging system that a new asset is to be acquired or the operator selects the named asset from a list stored by the asset identification system and presented to the user. The asset identification system is prepared to acquire an asset identifier image, and the operator directs the imaging system to acquire a visual image of the identifier. The asset identification system performs optical character recognition, spatial pattern decoding such as barcode decoding, or feature detection on the visual images. A discrimination quality metric is determined and if an image with sufficient quality is detected, the identifier image and decoded information is stored on the memory module and linked to the selected or new asset in the asset list. During subsequent scanning, the operator may indicate to the imaging system that an arbitrary previously-baselined asset is to be acquired and the asset identification system is prepared to acquire the asset identifier image. The asset identification system performs character recognition and pattern decoding on the images. The resulting decoded character and pattern information are compared with the stored asset information to search for a matching asset.

In some examples, a set of baseline asset identifier images previously obtained have been processed via the asset identification system 114 and include a vector description of features within each image. These vectors may be used to train a support vector machine (SVM) for the determination of matching vectors of a later-acquired image to uniquely identify a present scene relative to a previously-acquired scene. In some examples, the set of baseline scene images are used in place of the asset identifier images with feature detection and the extracted features are used to train a SVM to perform asset identification from the acquired scene image of each asset and thereby avoid the need for additional asset identifier image collection.

So configured, the device can store and/or retrieve information relating to a baseline scan of an environment to be used in subsequent scans. The asset identification system 114 can access a memory module and compare the presently scanned identifying information with data stored on the memory module to identify an asset match. By identifying a particular asset or portion of an asset, the device can display the relevant baseline image or image alignment data on the display as an overlay to assist the user with capturing the present image. As a result, the pose of the current image may closely match the pose of the baseline image, and thus a pixel-by-pixel analysis of the current image may be performed. The device also can process images after being captured and adjust the images to match the baseline image as closely as possible.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A thermal imaging system, the system comprising:
   a thermal imaging sensor configured to capture a plurality of thermal images of a plurality of assets in an environment;
   a non-thermal imaging sensor coupled to the thermal sensor, the non-thermal imaging sensor configured to capture a plurality of non-thermal images of the plurality of assets;
   an asset identification system configured to identify a particular asset from the plurality of assets, the particular asset being previously identified by being input into the asset identification system, the asset identification system identifying the particular asset by instructing a user to capture a unique identifier image associated with the particular asset and comparing the capture to a plurality of baseline unique identifier images;
   an image alignment system; and
   a controller configured to control operation of the thermal imaging sensor, the non-thermal imaging sensor, the asset identification system, and the image alignment system;
   wherein when the asset identification system identifies the particular asset, the controller is configured to (i) present at least one of a previously-captured baseline image or a template image of the particular asset to the user via a display such that the user may approximate an orientation of a present thermal view of the particular asset and a present non-thermal view of the particular asset to the at least one of the previously-captured baseline image or template image, (ii) control the image alignment system to adjust the orientation of the present thermal view of the particular asset and the present non-thermal view of the particular asset to match the at least one of the previously-captured baseline image or template image, and (iii) cause the thermal imaging sensor to capture a thermal image of the present thermal view of the particular asset and the non-thermal imaging sensor to capture a non-thermal image of the present non-thermal view of the particular asset.

2. The thermal imaging system of claim 1, wherein the asset identification system is configured to scan for identifying information using the non-thermal imaging sensor.

3. The thermal imaging system of claim 2, wherein the identifying information comprises at least one of a barcode, a name plate displaying visible characters and/or patterns, and other spatial pattern coding systems.

4. The thermal imaging system of claim 2, wherein the asset identification system is further configured to access a memory module and compare the scanned identifying information with data stored on the memory module to identify the particular asset.

5. The thermal imaging system of claim 1, wherein the asset identification system is configured to scan for identifying information using a radio frequency identification communication system.

6. The thermal imaging system of claim 5, wherein the identifying information comprises a radio frequency identification tag.

7. The thermal imaging system of claim 1, wherein the image alignment system is configured to apply image processing to a previously captured non-thermal image of the particular asset to establish a baseline image to compare to the present non-thermal view of the particular asset.

8. The thermal imaging system of claim 7, wherein the image alignment system is configured to apply image processing to a recently-captured non-thermal image.

9. The thermal imaging system of claim 8, wherein the image processing comprises at least one of a spatial transformation, a histogram normalization, an image segmentation, a thresholding, a spatial smoothing, and an edge detection.

10. The thermal imaging system of claim 7, wherein the image alignment system is configured to display the previously captured non-thermal image while displaying the present non-thermal view of the particular asset.

11. The thermal imaging system of claim 10, wherein the image alignment system is further configured to perform an image difference cost function to compare the processed previously captured non-thermal image to the captured non-thermal image.

12. The thermal imaging system of claim 11, wherein the image difference cost function is computed using at least one of a least-squares difference, a normalized mutual information, and a local Pearson correlation.

13. The thermal imaging system of claim 12, wherein the image alignment system computes an image coregistration that minimizes the cost function.

14. The thermal imaging system of claim 1, wherein the image alignment system is configured to access a memory module and retrieve a previously captured and stored non-thermal image of the particular asset to establish a baseline image and apply image processing to the present non-thermal image to compare the baseline non-thermal view with the present non-thermal view.

15. The thermal imaging system of claim 1, wherein the image alignment system is further configured to access a memory module and compare at least one feature derived from the present non-thermal image with feature data obtained from a previously acquired non-thermal image stored on the memory module to determine an image transformation that aligns the images.

16. A method of repeatably acquiring thermal images in an environment, the method comprising:
providing a thermal imaging system comprising a thermal imaging sensor adapted to capture a plurality of thermal images of a plurality of assets, a non-thermal imaging sensor configured to capture a plurality of non-thermal images of a plurality of assets simultaneously with the thermal image sensor, an asset identification system configured to identify a particular asset from the plurality of assets, an image alignment system, and a controller configured to control operation of the thermal imaging sensor, the non-thermal imaging sensor, the asset identification system, and the image alignment system;
identifying, via the asset identification system, the particular asset, the particular asset being previously identified by being input into the asset identification system, the asset identification system identifying the particular asset by instructing a user to capture a unique identifier image associated with the particular asset and comparing the capture to a plurality of baseline unique identifier images;
presenting, with the image alignment system, at least one of a previously-captured baseline image or a template image of the particular asset to the user via a display such that the user may approximate an orientation of a present thermal view of the particular asset and a present non-thermal view of the particular asset to the at least one of the previously-captured baseline image or template image;
adjusting, with the image alignment system, the orientation of the present thermal view of the particular asset and the present non-thermal view of the particular asset to match the at least one of the previously-captured baseline image or template image; and
causing, with the controller, the thermal imaging sensor to capture a thermal image of the present thermal view of the particular asset and the non-thermal imaging sensor to capture a non-thermal image of the present non-thermal view of the particular asset.

17. The method of claim 16, further comprising applying, with the image alignment system, image processing to at least one of a previously captured non-thermal image of the particular asset, a present non-thermal image of the particular asset, and a present non-thermal view of the particular asset.

18. The method of claim 17, further comprising displaying the previously captured non-thermal image while displaying one of the present non-thermal view and the present non-thermal view.

19. The method of claim 18, further comprising performing an image difference cost function that compares the previously captured non-thermal image to the non-thermal image.

20. The method of claim 19, wherein performing the image different cost function comprises computing an image coregistration that minimizes the cost function.

21. The method of claim 20, further comprising accessing a memory module and comparing at least one feature derived from the present non-thermal image with feature data obtained from a previously acquired non-thermal image stored on the memory module, and determining an image transformation to align the previously acquired non-thermal image and the present non-thermal image.

22. The method of claim 21, wherein the image coregistration is decomposed into an image scale component, a rotation component, and a translation component, the components being used to display indicators on the display corresponding to an intended repositioning and re-orienting of the imaging system so as to match a pose of the presently acquired imaging system with a pose of the previously acquired imaging system.

23. The method of claim 16, further comprising:
measuring, with an orientation measuring system, an orientation of the thermal imaging system to annotate the non-thermal image; and
using the orientation measuring system, initializing an image coregistration search routine.

24. The method of claim 16, further comprising applying, with the image alignment system, image processing to at least one of a previously captured thermal image of the particular asset, a present thermal image of the particular asset, and a present thermal view of the particular asset.

25. The method of claim 24, further comprising displaying the previously captured thermal image while displaying one of the present thermal image and the present thermal view.

26. A thermal imaging device, the device comprising:
a housing;
a thermal imaging sensor at least partially arranged on an exterior surface of the housing and configured to capture a plurality of thermal images of a plurality of assets in an environment;
a non-thermal imaging sensor at least partially arranged on the exterior surface of the housing and coupled to the thermal sensor, the non-thermal imaging sensor configured to capture a plurality of non-thermal images of the plurality of assets, the particular asset being previously identified by being input into the asset identification system, the asset identification system identifying the particular asset by instructing a user to capture a unique identifier image associated with the particular asset and comparing the capture to a plurality of baseline unique identifier images;
an asset identification system configured to identify a particular asset from the plurality of assets;
an image alignment system; and
a controller configured to control operation of the thermal imaging sensor, the non-thermal imaging sensor, the asset identification system, and the image alignment system;
wherein when the asset identification system identifies the particular asset, the controller is configured to (i) present at least one of a previously-captured baseline image or a template image of the particular asset to the user via a display such that the user may approximate an orientation of a present thermal view of the particular asset and a present non-thermal view of the particular asset to the at least one of the previously-captured baseline image or template image, (ii) control the image alignment system to adjust the orientation of the present thermal view of the particular asset and the present non-thermal view of the particular asset to match the at least one of the previously-captured baseline image or template image, and (iii) cause the thermal imaging sensor to capture a thermal image of the present thermal view of the particular asset and the non-thermal imaging sensor to capture a non-thermal image of the present non-thermal view of the particular asset.

* * * * *

UNITED STATES PATENT AND TRADEMARK OFFICE
CERTIFICATE OF CORRECTION

PATENT NO. : 10,116,884 B2
APPLICATION NO. : 15/091068
DATED : October 30, 2018
INVENTOR(S) : Erik Beall et al.

It is certified that error appears in the above-identified patent and that said Letters Patent is hereby corrected as shown below:

In the Claims

At Column 15, Lines 56-57, "one of the present non-thermal view and the present non-thermal view." should be -- one of the present non-thermal image and the present non-thermal view. --.

Signed and Sealed this
Nineteenth Day of April, 2022

Katherine Kelly Vidal
*Director of the United States Patent and Trademark Office*